3,481,564
ARRESTING GEAR INCLUDING A HOLDING STRAP
Claude Louis Edouard Marcheron, Montrouge, France, assignor to Societe d'Exploitation des Materiels Hispano-Suiza, Bois-Colombes, France
Filed July 27, 1967, Ser. No. 656,570
Claims priority, application France, Nov. 5, 1966, 82,665
Int. Cl. B64f 1/02
U.S. Cl. 244—110    5 Claims

ABSTRACT OF THE DISCLOSURE

The arresting gear comprises an artificial obstacle held in position by at least one strap. This strap is subjected to the action of a braking device and it is folded in a regular manner on a flat area in practically the whole of its portion located upstream of the braking device. This braking device is operated by control means adjusted by an adjusting device responsive to the movement of the strap leaving the braking device.

---

The present invention relates to vehicle arresting gears comprising an artificial obstacle secured to at least one holding strap or band passing through a stationary braking device of adjustable braking intensity, nearly the whole of the portion of said strap located upstream of said braking device being folded in a regular fashion into a package bearing through one edge of the strap on a fixed rigid flat support and having to unfold gradually before passing through said braking device, this arresting gear artificial obstacle being more especially intended to be placed across a landing field runway to stop an aircraft running on said runway.

In an arresting gear of this type, the unfolded part of the portion of the strap located upstream of the braking device undergoes, after an aircraft has struck the artificial obstacle, the action of inertia forces which may suddenly and in a disorderly fashion bring said unfolded part of the strap against the inlet of the braking device, thus causing a tangling of said strap which can be no longer enter correctly into said braking device.

The object of the present invention is to provide an arresting gear of the above mentioned kind which complies better than those known up to this time with the requirements of practice, particularly in order to prevent such tanglings of the strap at the inlet of the braking device.

According to the present invention, the control means for transmitting a variable energy to the braking device are operated by at least one adjusting device capable of comparing two indications supplied thereto and which represent, respectively, the instantaneous negative acceleration $\gamma$ of the strap and a quantity $V^2/x$ (V being the instantaneous speed of displacement of the strap and $x$ the length at the time that is considered of the unfolded part of the strap located upstream of the braking device), said adjusting device being arranged so that, if the value of the negative acceleration $\gamma$ is greater than quantity $V^2/x$, the energy delivered by said control means to said braking device decreases so that the value of acceleration $\gamma$ becomes once more equal to, or lower than, the value of quantity $V^2/x$.

Preferred embodiments of the present invention will be hereinafter described with reference to the appended drawings given merely by way of example and in which, FIG. 1 is a diagrammatic plan view with parts cut away of an arresting gear according to the present invention;

Figures 1, 2:
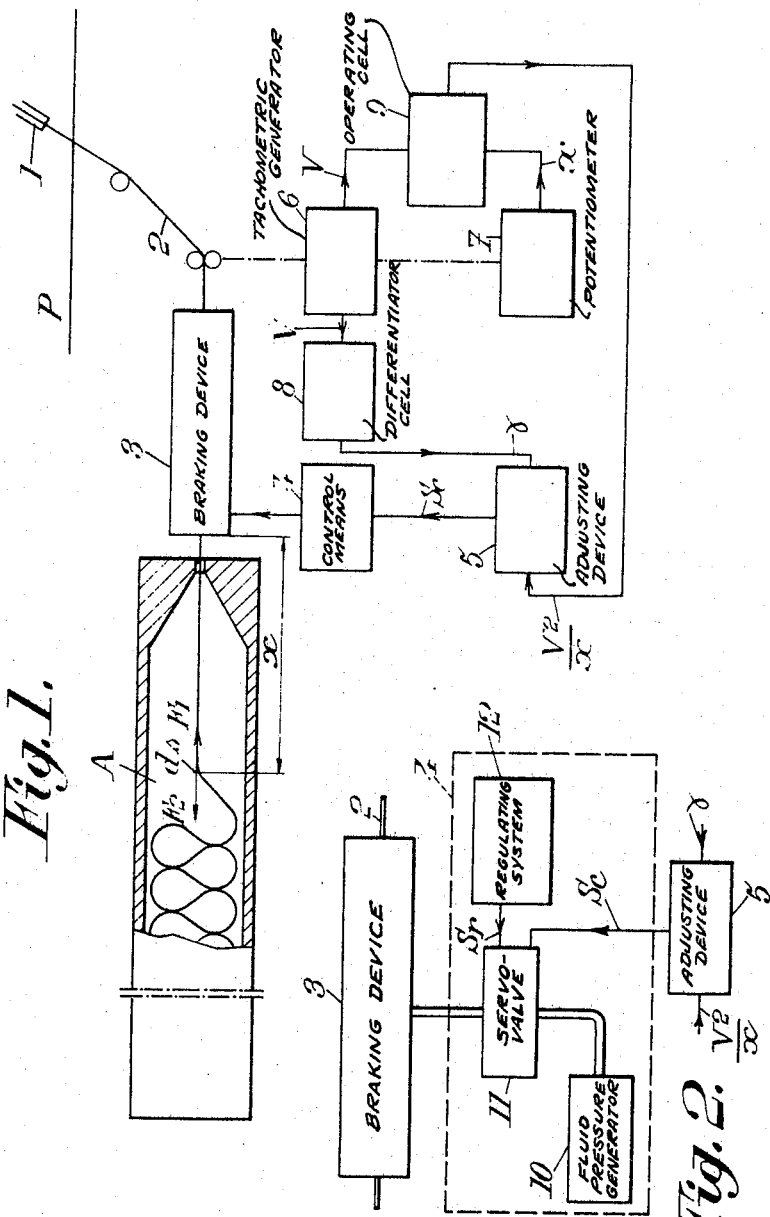
FIG. 2 is a more detailed diagrammatical view of a first modification of part of the arresting gear of FIG. 1.
Figure 4:
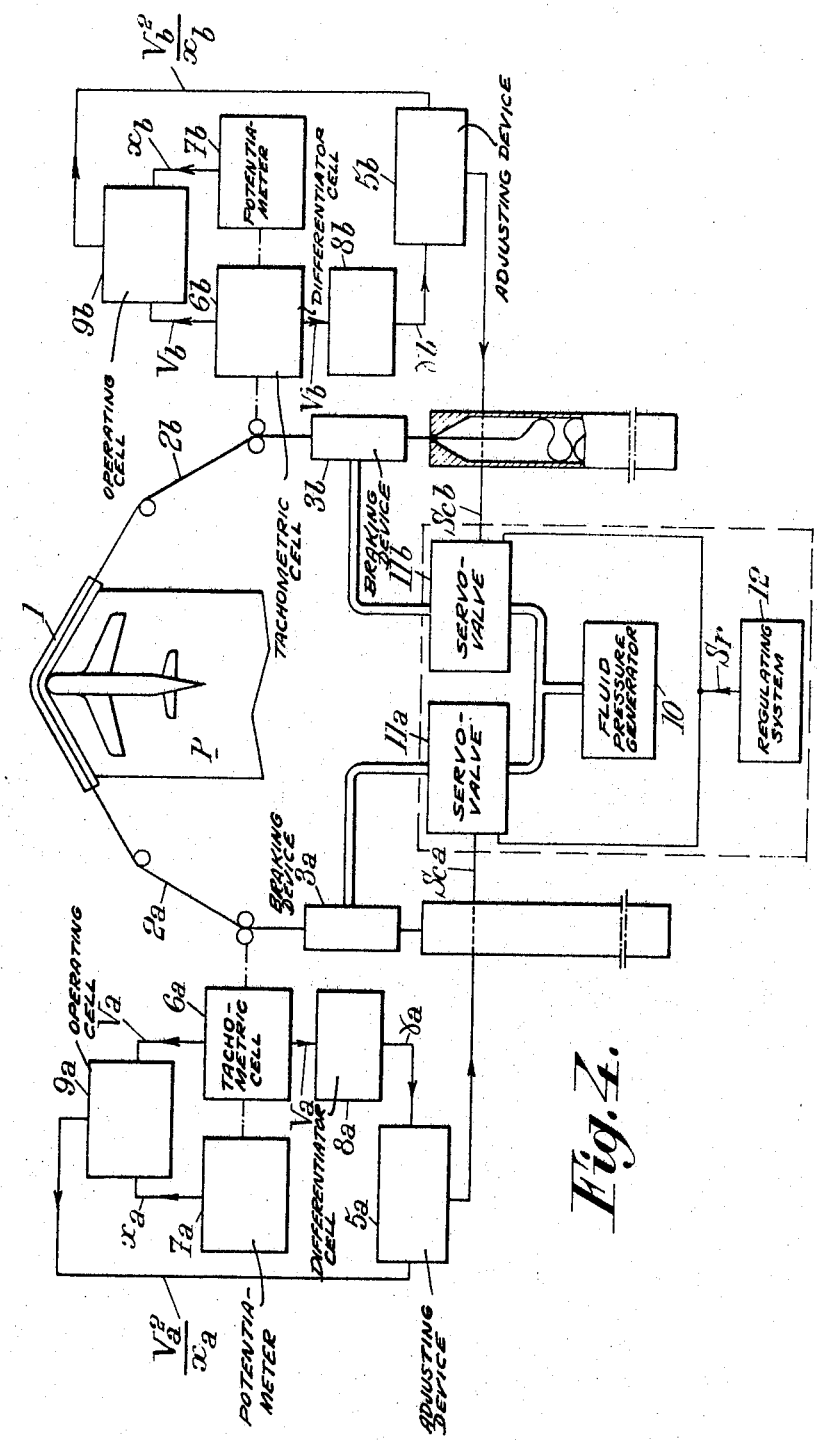
FIG. 4 is a diagrammatic top plan view of an arresting gear made according to a particular embodiment of the invention.

The artificial obstacle of the arresting gear may be made in any suitable manner, for instance as shown by FIGS. 1 and 4, by making use of a net.

When an aircraft strikes obstacle 1, the latter drives at least one strap 2 and preferably two such straps secured respectively to the ends of obstacle 1 and disposed symmetrically with respect to the axis of airfield runway.

In FIG. 1 only one of these two straps 2 has been shown.

Each strap 2 is subjected to the action of a braking device 3 of the shoe type carried in fixed position on the ground, preferably operated hydraulically and the braking intensity of which is adjustable.

The portion of strap 2 located upstream of braking device 3 is folded in a regular manner and rests through its lower edge upon a flat area A so as to be able to unfold gradually before reaching braking device 3.

Control means 4 are adapted to deliver an adjustable energy to braking device 3.

FIG. 1 shows the arresting gear immediately after an aircraft has struck net 1. The unfolded part of the strap has a length $x$, this length being located upstream of braking device 3.

A strap element $ds$ located at the limit between the unfolded part and the folded part of strap 2 is then acted upon by two momentums, to wit, on the one hand, an inertia momentum $F_1$ directly toward braking device 3, and on the other hand, a momentum $F_2$ opposed to the first one.

If $p$ designates the weight of the strap per unit of length, V the instantaneous speed of movement of the strap and $dV$ the reduction of this speed during time $dt$, momentum $F_1$ will be equal to $$F_1 = p.x.dV$$

and momentum $F_2$ will be equal to $$F_2 = p.V.dt.V$$

For practical purposes, the momentum caused by the force of friction of strap 2 against the flat area A upon which said strap is resting being neglected, strap element $ds$ will be in equilibrium at the time that is considered and will not be moved suddenly toward the inlet of braking device 3 if momentum $F_2$ is higher than, or equal to momentum $F_1$, that is to say if $$p.V.dt.V \geqslant p.x.dV$$

that is to say, if $\gamma$ designates the negative acceleration $dV/dt$ of strap 2, if $$\gamma \leq V^2/x$$

According to the main feature of the present invention, the control means 4 of braking device 3 are operated by an adjusting device 5 capable of comparing two indications transmitted to said device and which represent respectively the negative acceleration $\gamma$ of strap 2 and quantity $V^2/x$, said adjusting device 5 being arranged in such manner that, if the value of the negative acceleration $\gamma$ exceeds the value of quantity $V^2/x$, the energy delivered by control means 4 to braking device 3 decreases so that the value of acceleration $\gamma$ is again equal to, or lower than the value of quantity $V^2/x$.

It will be understood that, in these conditions, any risk of tangling of strap 2 at the inlet of braking device 3 is avoided.

As shown by FIG. 1 it is advantageous to make use of electronic means for materializing the indications representative of $\gamma$ and $V^2/x$.

For instance, one of the rollers for guiding strap 2 may be made to drive, on the one hand, a tachometric generator 6 which delivers a signal representative of the speed of movement V of said strap and, on the other hand, a rotary potentiometer 7 adapted to deliver a signal representative of the length $x$ of the unfolded part of the strap located upstream of braking device 3.

A differentiator cell 8 which receives signal V permits of calculating $\gamma = dV/dt$, whereas an operating cell 9 which receives signals V and $x$ permits of calculating $V^2/x$.

The indications representative of negative acceleration $\gamma$ and quantity $V^2/x$ are then introduced into adjusting device 5, consisting advantageously of a comparator cell which is capable, when the value of $\gamma$ exceeds the value of quantity $V^2/x$, of delivering signal $S_c$ fed to control means 4, and when the value of $\gamma$ does not exceed the value $V^2/x$, of delivering no signal.

Concerning said control means 4, it should be noted that they may advantageously comprise, as shown by FIG. 2, a generator 10 of hydraulic liquid under pressure (pump, accumulator, etc.), a servo-valve 11 with two windings, connecting generator 10 with braking device 3, and a regulating system 12 of a type suitable for the arresting gear that is considered, delivering a regulation signal $S_r$ fed to one of the windings of servo-valve 11.

In these conditions control signal $S_c$, delivered by adjusting device 5 (when the value of the negative acceleration $\gamma$ exceeds $V^2/x$) will be fed to the other winding of servo-valve 11.

Figure 3:
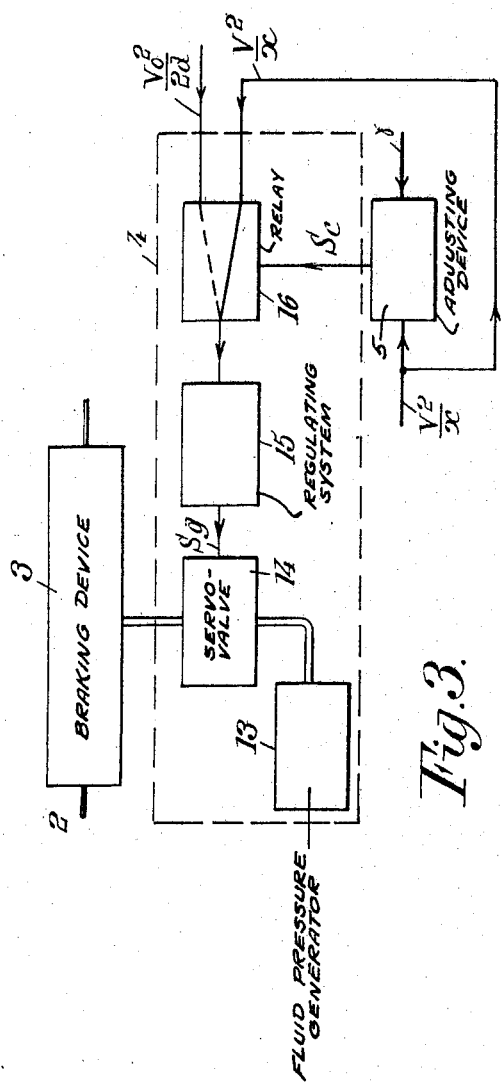
FIG. 3 is a view similar to FIG. 2 relating to another modification.

But such control means 4 might also comprise, as shown by FIG. 3, a generator 13 of hydraulic liquid under pressure (pump, accumulator, etc.), a servo-valve 14 of a suitable type (for instance a pressure responsive servo-valve) connecting generator 13 with braking device 3, and a regulating system 15 delivering a regulation signal $S_g$ fed to servo-valve 14, this regulating system 15 receiving, among other signals, a signal representative of the assigned value of a negative acceleration to be given to the aircraft to be braked.

This negative acceleration assigned value may in particular be equal (as indicated by the U.S. Patent No. 3,317,164 of May 2, 1967, granted to C.L.E. Marcheron for "Aircraft Arresting Gears") to $V_0^2/2d$, $V_0$ being the speed of the aircraft when it engages net 1 and $d$ representing a predetermined length of stopping.

A relay 16 is then provided for feeding regulating device 15, either with the signal representative of the assigned value $V_0^2/2d$ of the negative acceleration of the aircraft, or with the signal representative of quantity $V^2/x$, which is the maximum value that the instantaneous negative acceleration of the strap can have.

In these conditions, the control signal $S_c$ delivered by adjusting device 5 (when the valve of negative acceleration $\gamma$ exceeds the value of quantity $V^2/x$) assumes the control of this relay 16 which will then deliver to regulating system 15, either the signal representative of $V_0^2/2d$ if it dies not receive a control signal (connection shown in dotted lines on the drawings), or the signal representative of $V^2/x$ if it receives control signal $S_c$ (connection shown in solid lines).

It should be noted that the regulating system 15 may be that described in the above mentioned prior patent. This regulating system included means for producing signals representative of the speed of movement of the strap and of the length of the unfolded portion of said strap. Therefore it will be advantageous to use these signals for producing the indication representative of $V^2/x$.

Finally, it should be noted that, when the arresting gear comprises two straps disposed on opposite sides of the axis of the runway, each of these straps having its own braking device, it is advantageous to provide an adjusting device for each braking device.

In this case, use may be made of the embodiment of FIG. 4, where the same reference numbers designate the same parts as in FIGS. 1 and 2, an index $a$ being added to the reference numbers relative to the parts located on the left hand side of the runway, whereas an index $b$ is added to the reference numbers relative to the parts located on the right hand side of the runway.

The arresting gear of FIG. 4 includes: the generator 10 of hydraulic liquid under pressure common to both of the braking devices 3a and 3b, and regulating system 12, which may also be common to both of the braking sevices 3a and 3b and the regulation signal $S_r$ of which is fed, on the one hand, to one of the two windings of a servo-valve 11a connecting generator 10 with braking device 3a, and, on the other hand, to one of the two windings of a servo-valve 11b connecting generator 10 with braking device 3b.

In these conditions, the control signal $S_{ca}$ delivered by adjusting device 5a (when, for strap 2a, the value of the negative acceleration $\gamma_a$ exceeds the quantity $V_a^2/x$) will be fed to the other winding of servo-valve 11a and the signal $S_{cb}$ delivered by adjusting device 5b (when, for strap 2b, the valve of the negative acceleration $\gamma_b$ exceeds the value of quantity $V_b^2/x_b$) will be fed to the other winding of servo-valve 11b.

In a general manner, while the above description discloses preferred embodiments of the invention, it should be well understood that said invention is not limited thereto as there might be changes made in the arrangement, disposition and form of the parts without departing from the present invention.

What I claim is:

1. An arresting gear for vehicles running on the ground which comprises, in combination,
    an artificial obstacle for said vehicles,
    a strap secured to one end of said obstacle,
    a braking device of adjustable braking intensity for braking said strap which passes through said braking device, said braking device being stationary with respect to the ground,
    most of the portion of said strap located upstream with respect to the translation of the strap during displacement of said obstacle by a vehicle of said braking device being folded in zig-zag fashion,
    a rigid support for one edge of said strap folded portion,
    means for controlling the braking intensity of said braking device,
    means operative by said strap for supplying a first magnitude representative of the instantaneous negative acceleration of said strap during the displacement of said obstacle by a vehicle,
    means operative by said strap for supplying a second magnitude representative of the ratio $V^2/x$ of the square of the speed V of translation of said strap to the length $x$ of said strap that is unfolded upstream of said braking device and
    an adjusting device responsive to the difference of said first and second magnitudes for operating said braking device controlling means to have said first magnitude at most equal to said second magnitude.

2. An arresting gear according to claim 1, wherein said second and third mentioned means are electronic means.

3. An arresting gear according to claim 2, wherein said adjusting device is arranged to deliver a signal to said controlling means when said first magnitude exceeds said second magnitude and to deliver no signal as long as said first magnitude is at most equal to said second magnitude.

4. An arresting gear according to claim 2, wherein said second mentioned means include a tachometric generator and a differentiator interposed between the output of said tachometric generator and one input of said adjusting device and said third mentioned means include said tachometric generator, a potentiometer driven together with said tachometric generator, and an operating cell having two inputs connected respectively with the outputs of said tachometric generator and of said potentiometer, respectively, and one output connected with the other input of said adjusting device.

5. An arresting gear according to claim 3, wherein said braking device is adapted to be operated by a liquid under pressure, said arresting gear comprising a generator of liquid under pressure and a servo-valve for controlling the flow of liquid from said generator to said braking device said means for controlling the braking intensity of the braking device comprising a regulating system for delivering to said servovalve a signal to control it in response to an input signal fed to said regulating system, and a relay having two inputs and one output, said last mentioned output being connected with said regulating system to deliver thereto said input signal thereof, the first of said two relay inputs being connected to said operating cell to feed said second magnitude representative of $V^2/x$, the second of said two relay inputs being adapted to feed said relay with a signal proportional to $V_0^2/2d$ where $V_0$ is the vehicle speed when it engages said artificial obstacle and $d$ is an assigned distance of stopping for said vehicle, said relay being operatively connected with said adjusting device to be controlled by the signal therefrom so that when said last mentioned signal is transmitted from said adjusting device to said relay the first input of said relay is operative and said relay delivers a signal representative of $V^2/x$ to said regulating system whereas when no signal is transmitted from said adjusting device to said relay a signal representative of $V_0^2/2d$ is transmitted by said relay from said second input thereof to said regulating system.

References Cited

UNITED STATES PATENTS

| 3,317,164 | 5/1967 | Marcheron | 244—110 |
| 3,350,039 | 10/1967 | Crater | 244—110 |

MILTON BUCHLER, Primary Examiner

P. E. SAUBERER, Assistant Examiner